United States Patent Office 3,411,961
Patented Nov. 19, 1968

3,411,961
HEAT TREATMENT PROCESS FOR CREEP
RESISTANT SOLDER ALLOYS
Douglas J. Harvey, Utica, Mich., assignor to General
Motors Corporation, Detroit, Mich., a corporation
of Delaware
No Drawing. Original application Oct. 21, 1965, Ser. No.
500,333. Divided and this application Nov. 29, 1967,
Ser. No. 686,705
4 Claims. (Cl. 148—127)

ABSTRACT OF THE DISCLOSURE

A lead-based alloy containing about 1–5% tin, 0.1–2% silver and 0.1–0.8% indium and the balance lead may advantageously be employed as a creep resistant solder. The creep resistance of the alloy may be further increased by heating the composition to 250° F.–450° F. for about one hour and subsequently cooling to normal room temperature.

---

This application is a divisional application of my copending application Ser. No. 500,333 which was filed Oct. 21, 1965.

This invention relates to copper-brass heat exchangers such as automobile radiators and the like, and more particularly to a creep resistant lead base solder for use in such heat exchangers.

For many years automobile radiators and heater cores have been fabricated using a lead base solder. Perhaps the most common of these solder alloys consists of 70% lead and 30% tin. While this solder has sufficient strength at room temperature, it is much weaker and more subject to failure at 220° F. As it has become necessary, for economic reasons, to reduce them aterial weight of radiator and heater core brass sections, more and more stress is placed on the soldered joints. In recent years there has been an increase in the number of failures in these solder joints. These failures are due to a stress rupture or creep rupture of the lead-tin solder alloy at the operating temperature of the radiator. Therefore, it is now necessary to find a stronger solder means of joining heat exchanger sections. Preferably a lead base composition would be selected because of the low cost of lead. However, the strength of such solder in the range of 220° F. and particularly the creep resistance of the alloy in this temperature region must be substantially improved over the present composition.

Accordingly, it is an object of this invention to provide a high strength creep resistant lead based alloy. It is another object of this invention to provide a method of preparing a high strength creep resistant soldered bond. It is a more specific object of this invention to provide such a lead based alloy for use as a solder in automobile copper-brass radiators at an operating temperature of about 220° F.

These and other objects are accomplished with a lead based solder comprising, by weight, 1 to 5% tin, 0.1 to 2% silver, 0.1 to 0.8% indium and the balance substantially all lead. This solder composition is applied to parts to be formed in the molten state by a technique well known in the art. After the solder has solidified and cooled the joint is heated for about one hour at 250° F. to 450° F. and rapidly cooled to room temperature.

It is now well known that metals and alloys may fail in service even though they may never have been subjected to a stress as great as their yield strength or their elastic limit as determined by the conventional short-time tensile test. The cause of these failures may be either one or the other of two phenomena known as creep and fatigue. My invention relates to creep failure in lead based solders.

When a metal or alloy is submitted to a tensile stress for a long period of time, particularly at temperatures above room temperature, it may gradually elongate or "creep." As the stress is maintained, if the temperature is high enough, the metal may continue to deform and may eventually even fail. Of course, it follows that the rate of creep increases rapidly with temperature. Thus, while the conventional 70% lead, 30% tin solder has a room temperature tensile strength of nearly 8000 p.s.i., it has a 50 hour rupture stress of only 80 p.s.i. at 220° F. This means that rupture will occur in such an alloy in 50 hours when it is loaded to a stress of 80 p.s.i. at 220° F. It would be preferable to have available a cheap solder having a greater creep resistance at automotive radiator operating temperatures.

I have made the surprising discovery that lead based solders having a tin content of less than 5% by weight have a much greater rupture strength at 220° F. than do those solders containing substantially more tin. This is true despite the fact that the relationship between the room temperature tensile strengths of the respective alloys is just the opposite. For example, an alloy of 70% lead and 30% tin has displayed a tensile strength of nearly 8000 pounds per square inch at room temperature. Yet the same alloy under a load of 1000 pounds per square inch at 220° F. will fail in a few minutes. On the other hand a solder consisting of less than 5% tin and the balance lead has a lower tensile strength at room temperature but a substantially higher rupture strength at 220° F.

In addition to reducing the tin content of the conventional lead solder, I have found that the creep resistance may be further increased by including a small amount of silver. I have conducted numerous tests which show the desirable effect in terms of creep resistance upon the conventional lead solder of reducing tin content and adding small amounts of silver.

These tests were conducted by placing solder specimens under a constant dead weight load at a temperature of 220° F.±1° until rupture occurred. Two types of specimens were used. The first type of specimen, characterized by an A in the table below, was a soldered brass assembly, and the second type of specimen B was an all solder stress rupture rod. Specimen A was prepared by assembling two 0.007" thick brass sheets (1" x 1¾"). Before assembly the brass parts were bent, 5/16" from the end, around a 0.020" radius to form an included angle of 45°. Soldering was done using a gas torch with the parts held in a fixture. The parts were joined at the bend. The amount of solder was held constant at 0.085 gram and a proprietary flux was used on all specimens. The soldered stress specimen was designed to simulate a soldered radiator joint and was found to give the most reproducable results of the soldered specimens examined. Specimen B was simply a small all solder stress rupture bar made from cast and extruded alloy. ⅛" diameter extruded solder was mechanically reduced to 0.094" diameter in the test section and the small bars were soldered to brass strips to facilitate their attachment to the loading frame.

The specimens were subjected to a constant load at a temperature of 220° F. and the time at which rupture occurred was noted. A plot was made of load versus the logarithm of the time to rupture at constant temperature. In this way 50 hour rupture stresses were obtained for purposes of comparison of different alloys. Typical results are summarized in the table below.

| Specimen | Percent | | | Load | Time, hours | Temperature, ° F. |
|---|---|---|---|---|---|---|
| | Pb | Sn | Ag | | | |
| B | Bal. | 30 | | 80 p.s.i | 50 | 220 |
| B | Bal. | 30 | | 800 p.s.i | 0.2 | 220 |
| A | Bal. | 30 | | 3.2 lbs | 50 | 220 |
| A | Bal. | 20 | 0.5 | 3.2 lbs | 50 | 220 |
| A | Bal. | 10 | 1.0 | 4.6 lbs | 50 | 220 |
| A | Bal. | 4.0 | 2.0 | 14.1 lbs | 50 | 220 |
| A | Bal. | 2.0 | 1.0 | 15.1 lbs | 50 | 220 |
| A | Bal. | 1.0 | 2.0 | 7.3 lbs | 50 | 220 |
| A | Bal. | | 2.5 | 10.1 lbs | 50 | 220 |

In the case of specimen A the cross sectional area could not be determined and the loads are simply dead weight loads. However, in the case of specimen B, the stress in pounds per square inch could be determined.

It is seen that lead solders with a tin composition in the range of 10 to 30% display very little improvement in creep resistance. However, I have found that by reducing the tin content below 5% and by including up to 2% silver in the solder, the 50 hour rupture stress at 220° F. is increased over four times that of the conventional solder. All of the alloys in the range of 1 to 5% tin and 0.1 to 2% silver display significant improvement in creep resistance over the conventional lead solder. As shown in the table above, the most desirable of these solders was the one consisting of 2% tin, 1% silver and the balance substantially all lead which had a 50 hour rupture load at 220° F. of 15.1 pounds which is over 4½ times that of the conventional solder under the same conditions.

I have further found that by incorporating small amounts of indium, preferably up to 0.8% indium by weight to my solder improves its creep resistance. In addition, this solder alloy may be heat treated to further enhance its creep resistance. Typical stress rupture data for this alloy is tabulated below for purposes of comparison.

| Specimen | Percent | | | | Load, p.s.i. | Time, hrs. | Temperature, ° F. |
|---|---|---|---|---|---|---|---|
| | Pb | Sn | Ag | In | | | |
| A | Bal. | 2.0 | 1.0 | 0.2 | 1,180 | 50 | 220 |
| A | Bal.¹ | 2.0 | 1.0 | 0.2 | 1,300 | 50 | 220 |
| A | Bal. | 2.0 | 1.0 | 0.8 | 1,090 | 50 | 220 |
| A | Bal.² | 2.0 | 1.0 | 0.8 | 1,140 | 50 | 220 |
| A | Bal. | 2.0 | 1.0 | 0.4 | 1,130 | 50 | 220 |

¹ Aged at 450° F., one hour.
² Aged at 250° F., one hour.

It is seen that the addition of 0.2% indium to the 2% tin, 1% silver, 97% lead alloy results in a substantial increase in the 50 hour rupture stress at 220° F. over that of the lead, tin and silver solder. These indium containing alloys are responsive to heat treatment at temperatures above the operating temperature of the radiator. Those alloys containing higher amounts of indium, 0.4% to 0.8% were more responsive to aging at lower temperature, i.e. about 250° F. On the other hand, the alloys containing smaller amounts of indium, less than 0.4%, were more responsive to heat treatments at 450° F. The effect of such heat treatment on these alloys is seen in the table above. This temperature difference in susceptibility to heat treatment manifests itself in another way. It was observed that, in untreated specimens stressed at 220° F., those alloys containing the smaller amounts of indium took longer to rupture at high stresses. However, with lower stresses, those alloys containing higher amounts of indium actually took longer to rupture. This was believed to be due to the fact that when more time passed before rupture, the higher indium content alloy had an opportunity to respond to the heat treatment at 220° F. and therefore obtain better creep resistant properties.

Thus, I have found that lead based alloys comprised, by weight, of 1 to 5% tin, 0.1 to 2% silver, 0.1 to 0.8% indium, and the balance substantially all lead have vastly improved creep resistant properties at 220° F. over those now known in conventional lead based alloys. This material is particularly useful as a solder in automobile heat exchangers, but, of course, could be utilized in any application in which a creep resistant lead based material is required.

These alloy compositions can be prepared by melting and combining the respective constituents. The molten material is then cast. Subsequently it may be extruded as a wire if it is convenient to use it in this form. If the alloy is to be used as a solder it is remelted at that time and applied to parts which are to be formed. Upon solidification, a strong creep resistant bond is formed.

When it is desired to have a solder bond even more resistant to creep the soldering process is modified to include a heat treatment.

After the solder has solidified and cooled so that the assembly can be moved without damaging the bonded joint the entire assembly including the joint is reheated preferably at 250° F. to 450° F. for one hour and subsequently cooled to room temperature. As shown in the table above, it is preferable to heat those alloys containing higher amounts of indium, about 0.4% to 0.8%, at the low end of the above temperature range, i.e. about 250° F. Those alloys containing lower amounts of indium, 0.1% to about 0.4%, are preferably heat treated at the upper end of the preferred range, about 450° F. An increase in the creep resistant properties of my alloy composition has been obtained by heating at temperatures lower than 250° F. However, longer periods were required which normally could not be tolerated in production. Similarly, temperatures between 450° F. and the melting point of the alloy, 588° F.±5° F. could be considered for the heat treatment. It is felt, however, that the rate might be too great at these temperatures to allow for consistent results in a production-type operation.

In the heat treatment of the subject composition, when the material is utilized as a solder in automobile heat exchangers, it is sufficient to air cool the assembly from the heat treat temperature after one hour at that temperature. However, it should be realized that there may be other applications in which my alloy composition can advantageously be utilized in which air cooling would be too slow and overaging would occur. This could be the case in which massive sections are formed. It might be preferable in these cases to use more efficient cooling means.

While my invention has been described in terms of certain specific examples, it is to be understood that other modifications or applications of the composition might readily be adopted by those skilled in the art and would be within the teachings of my invention. Therefore, it is to be limited only by the following claims.

I claim:
1. An improved method of soldering comprised of melting the solder alloy, applying said molten solder to the metal parts which are to be formed, cooling said soldered joint to a temperature below the solidification range of said solder, heating said soldered joint at 250° F. to 450° F. for up to about one hour and subsequently cooling to normal room temperature, said solder alloy being comprised, by weight, of 1 to 5% tin, 0.1 to 2.0% silver, 0.1 to 0.8% indium, and the balance substantially all lead.

2. A method of soldering as in claim 1 wherein the indium content of said solder alloy is 0.2% by weight and said soldered joint is heated at about 450° F. for about one hour.

3. A method of soldering as in claim 1 wherein the indium content of said solder alloy is 0.8% by weight and said soldered joint is heated at about 250° F. for about one hour.

4. A method of improving the creep resistance of a lead based alloy, said alloy being comprised, by weight, of 1 to 5% tin, 0.1 to 2.0% silver, 0.1 to 0.8% indium, and the balance substantially all lead; said method comprised of heating said alloy at 250° F. to 450° F. for about one hour and subsequently cooling to normal room temperature.

References Cited

UNITED STATES PATENTS

| | | | |
|---|---|---|---|
| 2,148,741 | 2/1939 | Gonser | 148—158 |
| 2,375,755 | 5/1945 | Bassett et al. | 148—158 |
| 3,355,284 | 11/1967 | Harvey | 148—127 |
| 3,355,285 | 11/1967 | Harvey | 75—166 |

RICHARD O. DEAN, *Primary Examiner.*